United States Patent

Sakurai et al.

[11] Patent Number: 5,627,441
[45] Date of Patent: May 6, 1997

[54] APPARATUS FOR CONTROLLING MOTOR DRIVE AND METHOD FOR CONTROLLING THEREOF

[75] Inventors: Tetsuji Sakurai; Katsuhiko Kaida, both of Tokyo, Japan

[73] Assignee: Kabushiki Kaisha Toshiba, Kanagawa-ken, Japan

[21] Appl. No.: 465,719

[22] Filed: Jun. 6, 1995

[30] Foreign Application Priority Data

Jun. 8, 1994 [JP] Japan .................................. 6-126391

[51] Int. Cl.$^6$ .................. H02P 6/14; H02P 5/05
[52] U.S. Cl. ..................... 318/599; 318/254; 318/138
[58] Field of Search ........................ 318/138, 254, 318/439, 599, 700–710; 363/26, 134

[56] References Cited

U.S. PATENT DOCUMENTS

| | | | |
|---|---|---|---|
| 4,641,066 | 2/1987 | Nagata et al. | 318/254 |
| 5,036,264 | 7/1991 | Ueki | 318/254 |
| 5,317,243 | 5/1994 | Cameron | 318/254 |
| 5,481,167 | 1/1996 | Rohrbaugh et al. | 318/254 |
| 5,486,743 | 1/1996 | Nagai | 318/439 |
| 5,517,095 | 5/1996 | Carobolante et al. | 318/254 |

*Primary Examiner*—Paul Ip
*Attorney, Agent, or Firm*—Limbach & Limbach L.L.P.

[57] ABSTRACT

This invention relates to a motor drive control apparatus for using, for example, a spindle motor of a magnetic disk system. The inventioned apparatus achieves a motor drive control apparatus of high efficiencies with eliminating dead loss of power consumption and avoiding switching noises.

The inventioned apparatus for controlling revolution drive of a motor comprising a motor including a rotor and a plurality of drive coils for defining number of excitation phases for making the rotor one cycle revolution and a current supply means for supplying a plurality of drive currents in a successive order to the plurality coils from a voltage source directly.

The inventioned apparatus further includes first detecting means for detecting a rotational position of the rotor in each of the excitation phases, second detecting means for detecting number of revolution of the rotor by using a the detected rotor position signal from the first detecting means and a time setting means for determining a current supply time and a start timing for an excitation for the respective coils in each excitation phase in accordance with a detected difference between the detected number of revolution of the rotor and a predetermined target number of revolution of the rotor.

The drive pulse forming circuit generates a drive pulse signal to the current supply means for supplying a plurality of drive currents to the plurality coils in accordance with the determined current supply time and a start timing for each excitation phase.

17 Claims, 8 Drawing Sheets

APPARATUS FOR CONTROLLING MOTOR DRIVE AND METHOD FOR CONTROLLING THEREOF

FIELD OF THE INVENTION

This invention relates to an apparatus for controlling revolution drive of a motor and method for controlling thereof.

In particular, this invention relates to an apparatus for controlling revolution drive of a spindle motor using for a magnetic disk drive and method for controlling thereof.

More particularly, this invention relates to an apparatus for controlling rotation drive of a PWM excitation phase synchronous control type spindle motor.

BACKGROUND ART OF THE INVENTION

A computer system, in particular, a small size computer system usually uses a spindle motor for rotational driving of a magnetic memory disk.

Such a spindle motor usually includes a rotor and a plurality of drive coils for giving revolution forces to the rotor.

The number of drive coils defines the number of excitation phases for making the rotor one cycle revolution. For example, a three phased spindle motor includes three drive coils. For making a rotor of the three phased spindle motor one cycle revolution, it needs to provide total six excitation phases.

The two coils among the three coils are excited at one excitation phase with shifting phases one by one in a predetermined successive order during the total six excitation phases in order to one cycle revolution drive of a rotor.

A conventional apparatus for controlling revolution drive of a spindle motor usually used a current control type apparatus.

FIG. 7 shows an example of such a current control type apparatus for controlling revolution drive of a spindle motor in which three motor drive signals U,V and W are provided to the respective three coils for making a rotor one cycle revolution.

As shown in this figure, it needs to provide a drive current signal in a full time of each excitation phase for making a coil excitation in a current control type apparatus.

In this type apparatus, these motor drive signals are supplied through a current control circuit and a current supply circuit which are provided between a source voltage and the coils in serial. The current control circuit controls an amount of a constant drive current so as to change its value in response to a detected revolution speed of a motor.

Namely, the conventional apparatus achieves a stable revolution drive of a spindle motor by changing a value of a constant current for exciting a full time of a phase in accordance with a revolution state of a motor.

However, since the current control circuit is provided between the power source and the drive coils in serial, the current control circuit itself wastes a power of and it causes to drop down the source voltage due to a wasting power loss in the current control circuit.

Consequently, it is impossible to use the power source voltage efficiently for supplying a drive current to the respective coils.

This is a serious problem, in particular, for a small size computer system since it usually uses a battery source for driving a magnetic memory disk.

In order to avoid such a wasting power loss of the source voltage, it is proposed to provide a chopper control type motor control apparatus for making revolution control of a spindle motor.

The chopper control type motor control apparatus uses a pulse wave moduration signal (hereinafter refers to "PWM signal") for driving a motor as shown in FIG. 8. for exciting a coil in a exciting phase.

As shown in the figure, the value amount of the respective motor drive signals is maintained at a maximum value of the source voltage Vcc since the power source is directly coupled to the respective coils.

Namely, the PWM signal controls an on/off operation of the source voltage at a maximum value with a certain PWM-duty (B/A) cycle.

The on/off duty cycle of the PWM signal changes in accordance with a detected revolution speed of a spindle motor. Namely, the chopper control type motor control apparatus artificially adjusts an amount of a drive current by an on/off switching operation of the source voltage directly for eliminating a power loss in a current control circuit.

However, the chopper control type motor control apparatus also has anther serious problem of switching noises. Since the source voltage is frequently on/off switching at the maximum value with a short period, it causes to produce big noises.

Since read/write operations to a magnetic disk is done by a small value signal, switching noises are also a serious problem for a small size computer. It causes to make an error operation of a reading data or a writing data.

As mentioned, the conventional current control type motor drive apparatus has a defect of wasting consumption of a power source and the chopper control type motor drive apparatus also has a serious problem of switching noises.

Accordingly, it is an object of the invention to provide a new apparatus and method for controlling revolution drive of a motor of an efficient use of a power source.

It is another object of this invention to provide a new apparatus and method for controlling a revolution drive of a motor of a low switch noise.

It is another object of this invention to provide a new apparatus and method for controlling revolution drive of a spindle motor which can eliminate a waste loss consumption of a power source and also can decrease an influence of a switching noise during a small signal operation.

It is still another object of this invention to provide a PWM exciting phase synchronous control type apparatus for controlling revolution drive of a spindle motor which can achieve an efficient use a power source and also can decrease an influence of the noises due to the PWM switching operation during a read/write operation.

It is still further object of this invention to provide a PWM exciting phase synchronous control type apparatus for achieving revolution drive of a spindle motor which can adjust an amount of a drive current by changing a PWM duty in an exciting phase without appearing a switching noise.

It is still more object of this invention to provide an apparatus and method for controlling motor revolution which can minimize spike noises during a read/write mode operation.

It is still more object of this invention to provide an apparatus and method for controlling motor revolution which can change a drive mode in order to minimize spike noises during a read/write operation and also to reduce the power consumption during another operation.

SUMMARY OF THE INVENTION

The inventioned apparatus follow controlling revolution drive of a motor comprises a motor which includes a rotor and a plurality of drive coils for defining number of excitation phases for making the rotor one cycle revolution, means for supplying a plurality of drive currents in a successive order to the respective coils from a voltage source directly.

The apparatus further includes means for detecting a revoluting position of the rotor in each excitation phase, means for detecting number of revolution of the rotor by using a rotor position signal from the detecting means for detecting a rotational position of the rotor, means for determining a current supply time and a start timing for an excitation of the coils in each excitation phase by detecting a difference between the detected number of revolution of the rotor and a predetermined target number of revolution of said rotor, and means for generating a drive pulse signal to the supply means for supplying a plurality of drive currents to the respective coils in accordance with the timing signal from the determination means for determining a current supply time and a start timing for an excitation.

The apparatus of the invention supplies a plurality of drive currents to the respective coils at a maximum value of a drive current with synchronous to each exciting phase which is shifting one by one for making one cycle revolution of a rotor.

Further the inventioned method for controlling revolution of a motor which has a rotor and a plurality of coils for defining number of excitation phases, comprises the steps of detecting a rotational position of the rotor in each excitation phase, detecting number of revolution of the rotor by using a detected rotor position signal from the first detection step for detecting a rotational position of the rotor, determining a current supply time during each excitation phase in accordance with a detected difference between the detected revolution number of a rotor from the step of detecting number of revolution of the rotor and a predetermined target number of revolution, and supplying a plurality of drive current signals to the respective coils in a predetermined successive order with :synchronous to an excitation timing in response to the detected rotor position.

THE DETAIL EXPLANATION OF THE PREFERABLE EMBODIMENT OF THE INVENTION

Now referring to figures, we explain one preferable embodiment of the present invention.

Figure 1:
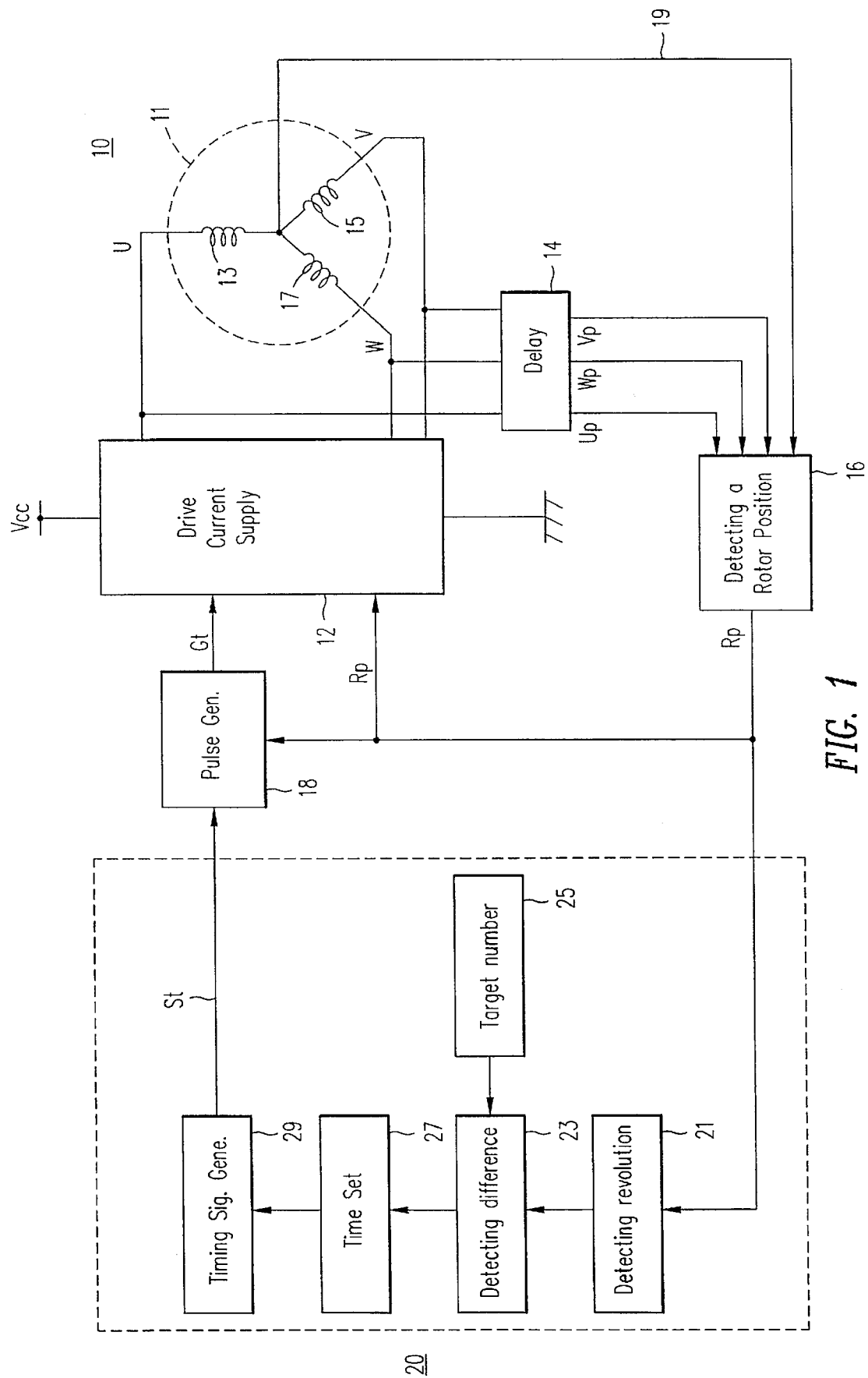
FIG. 1 shows a schematic diagram of the construction of one embodiment of the inventioned PVVM excitation phase synchronous control type apparatus for controlling motor revolution drive.

FIG. 1 shows a schematic diagram of the construction of the inventioned PWM exciting phase :synchronous control type apparatus for controlling revolution drive of a motor.

In the figure, a spindle motor 10 includes a rotor 11 and three coils 13, 15 and 17 which are positioned on the rotor 11 at a certain distance.

A drive current supply circuit 12 provides the three driving forces U,V and W to the respective three coils 13, 15 and 17 for producing revolution drive forces to the rotor 11 by excitation of the respective coils.

Figure 2:
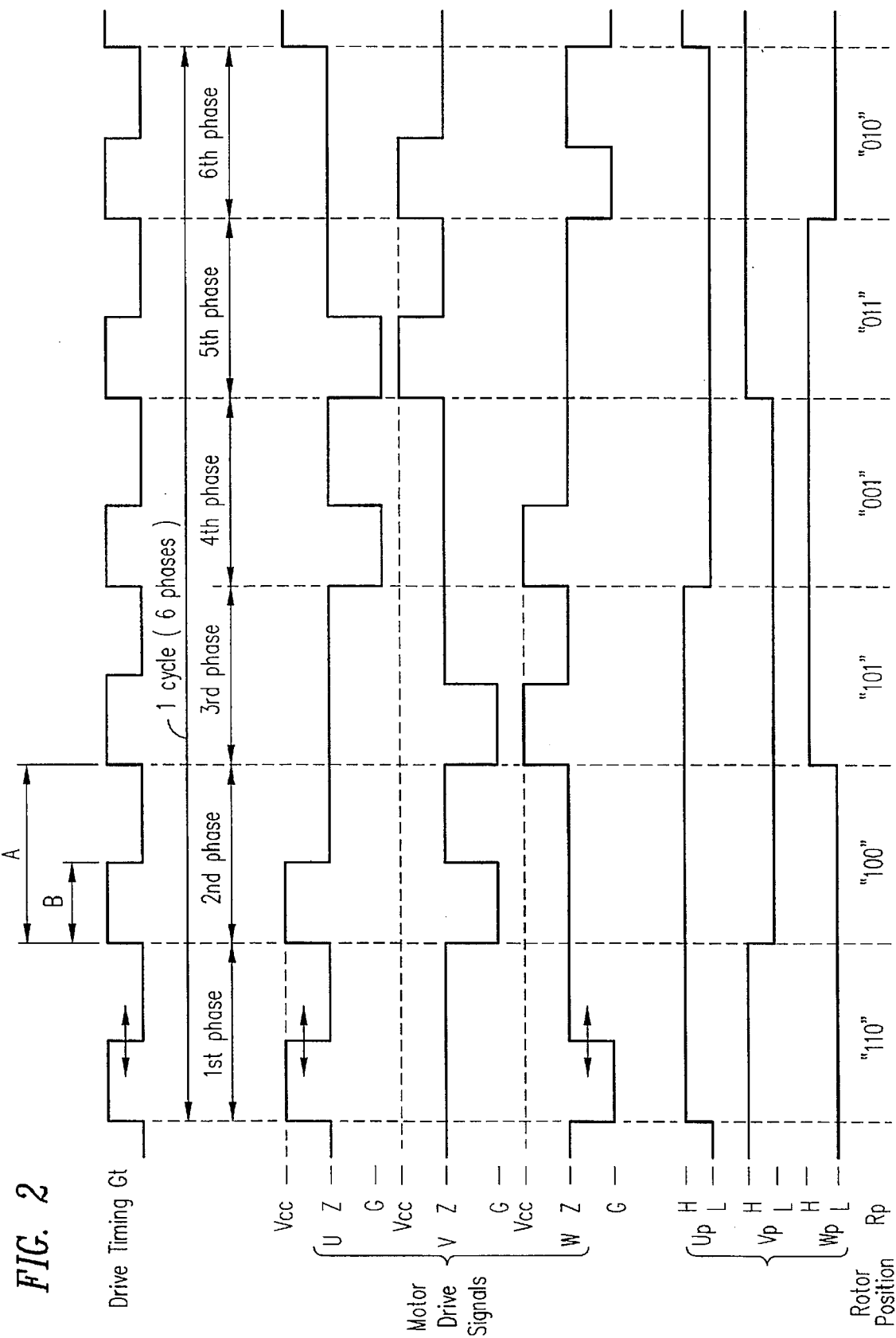
FIG. 2 depicts timing charts for explaining as relationship among a drive timing signal Gt, motor drive signals U, V, and W and rotor positioning signal Rp.

As previously explained, two coils among the three are exciting in each excitation phase as shown in FIG. 2.

Three back electromotive forces Up, Vp and Wp are produced by a superimposition of the respective driving forces U,V and W and they are supplied to a rotor position detecting circuit 16 through a delay circuit 14. The delay circuit adjusts the back electromotive forces Up, Vp and Wp to a revolution number of the rotor.

The signals of the respective back electromotive forces Up, Vp and Wp and a motor signal 19 are supplied to a first detecting circuit 16 for detecting a rotor position in an excitation phase and which provides a rotor position signal Rp.

The rotor position signal Rp is commonly supplied to the drive current supply circuit 12, a pulse forming circuit 18 and an CPU 20.

The rotor position signal Rp supplied to the drive current supply circuit 12 for determining a direction of an excitation current in each excitation phase.

The position signal Rp supplied to the pulse forming circuit 18 is used for generating a drive timing pulse signal Gt of a certain width B. The pulse signal Gt is supplied to the the drive current supply circuit 12.

The drive current supply circuit 12 i8 directly coupled to a source voltage Vcc for providing a driving force of a maximum current value to the respective coils.

The CPU 20 determines a current supply time B in each excitation phase A in accordance with a difference between the detected actual revolution number of a rotor and a predetermined target number of revolution.

The actual revolution number is detected in a second detecting means 21 by using the rotor position signal Rp. The detected revolution number is compared to the preset target revolution number 25 at a third detecting means 23.

The third detecting means 23 detects a difference between the detected revolution number of the rotor 11 and the target revolution number 25 and delivers a difference signal to a time setting means 27.

The time setting means 27 decides a time for driving coils in each excitation phase in accordance with the detected difference in the third detection means and delivers a time signal to a timing signal generating means 29.

The timing signal generating means 29 delivers a time setting signal St to the pulse forming circuit 18 which supplies a drive timing signal Gt of a pulse width B in each excitation phase A as shown in FIG. 2.

Namely, the current supply time B by the drive timing signal Gt varies in response to the detected difference of revolution number of the rotor in each excitation phase.

In FIG. 2, the drive timing signal Gt indicates to supply a drive current to a coil with synchronizing to an excitation phase shift.

The drive current supply circuit 12 supplies a drive force of a maximum value of the source voltage Vcc to the respective coils 18, 15 and 17 in a successive order so as to give a revolution force to the rotor by an on-and-off action which is synchronous to the drive timing signal Gt.

By varying the PWM ratio (B/A) relating to the current supply time (pulse width) B against an excitation phase term A in responding to the detected revolution difference, it is achieved to drive a stable revolution of a motor.

FIG. 2 depicts timing charts for explaining a relationship of a rotor among a drive timing signal Gt, motor drive signals U,V and W, back electromotive forces Up,Vp and Wp and a rotor position signal Rp for making one cycle revolution.

FIG. 2 explains one cycle rotation of a rotor with six exiting phases. For this operation, six pulses of the drive timing signal Gt are supplied from the CPU 20. The pulse width B is variable in the phase interval A with a detection of a difference from the target rotation numbers.

Accordingly, the current supply time B is variable for a stable rotation of the motor 10. Namely, the PWM duty ( B/A ) is variable in each exciting phase term A.

For making a rotor revolution drive of a three-phases motor, usually a pair of coils among the three are constantly excited by the selected two motor driving signals with successively shifting a phase one by one from first phase to sixth phase for one cycle revolution.

The motor drive signals U,V and W are respectively superimposed to produce the respective back electromotive forces Up, Vp and Wp. These back electromotive forces are supplied to the first detecting means 16 for detecting a rotor position.

As shown in FIG. 2, a rotor position signal Rp indicates the rotor position in the respective phases, for example, "110" for the first phase, "100" for the second phase, "101" for the 3rd phase, "001" for the 4th phase, "011" for the 5th phase and "010" for the 6th phase.

As explained above, the position signal Rp is commonly supplied to the CPU 20, the drive current supply circuit 12 and the pulse generating circuit 18 for a synchronous control of the rotor revolution.

In the inventioned apparatus, the revolution number of a motor is controlled by varying the drive current supply time during an excitation phase in response to the drive timing signal Gt with keeping a maximum value from the source voltage Vcc.

Figure 3:
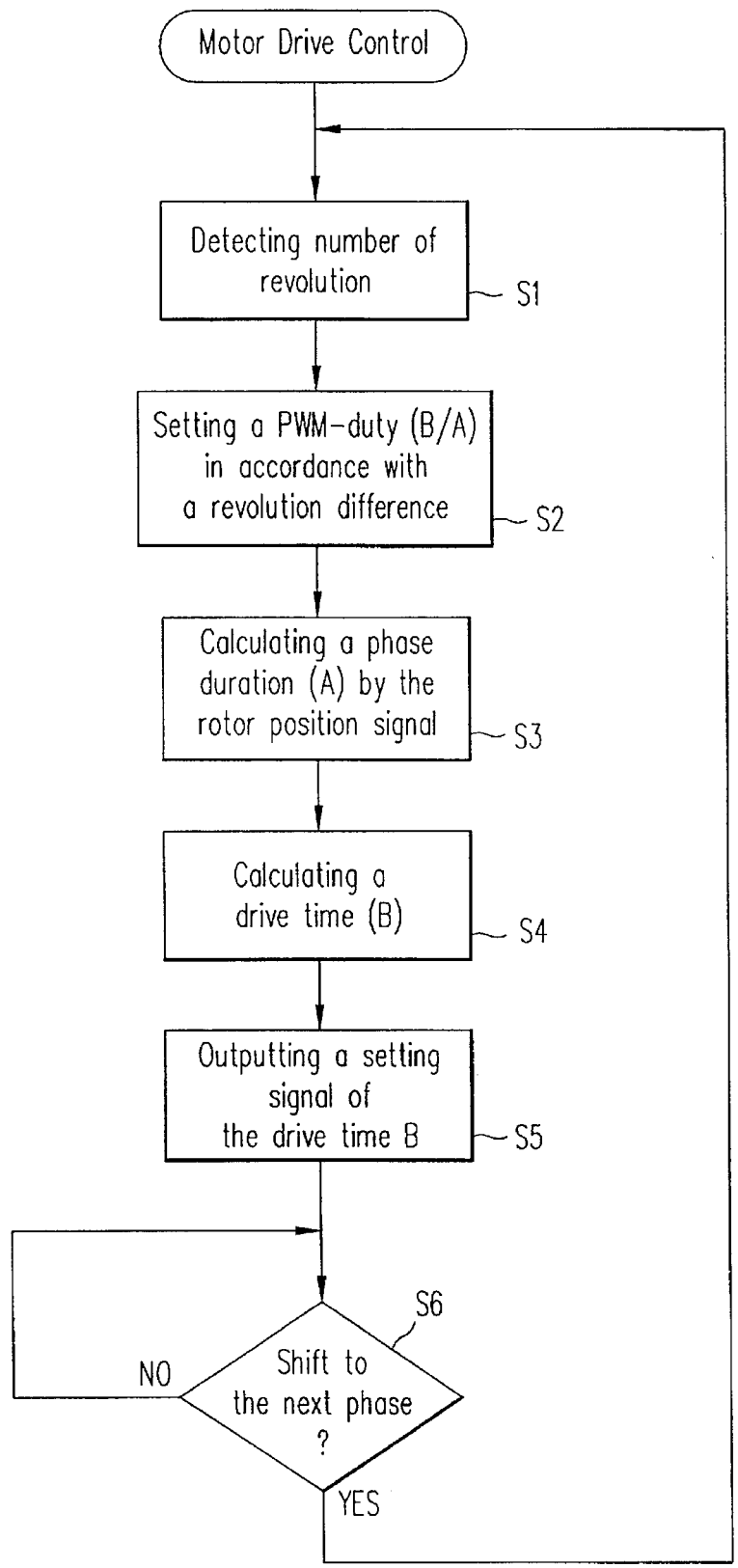
FIG. 3 is a flow chart for explaining the inventioned method for controlling motor rotation drive of PWM excitation phase synchronous control type.

FIG. 3 is a flow chart for explaining the inventioned method for controlling revolution drive for a PWM excitation phase synchronous control type motor.

The control operation begins as the first step S1 in which the CPU detects the revolution number of the rotor by using the rotor position signal Rp at the detection time.

Then the detected revolution number is compared to the target revolution number for defining a difference amount of the revolution. In accordance with the difference, a PWM duty (B/A) for an excitation phase as the second step S2.

At the third step S3, the CPU calculates one phase time (A) by using the rotor position signal Rp. Then, at the next step S4, the current supply time B is calculated from the one phase time A and the PWM duty (B/A).

As the fifth step S5, the drive time (B) setting signal St is supplied to the pulse forming means 18.

At the sixth step S6, when the rotor position signal indicates that an excitation phase is shifted to the next, all steps S1 to S5 are repeated for determining the current supply time for the next excitation phase.

The adjusted time setting signals Gt are successively supplied to the drive current supply circuit is through the pulse forming means 18.

The motor drive signals U, V and W are successively supplied to the respective coils in responding to the rotor position signal Rp so as to drive the motor at a stable revolution at the predetermined target rotation numbers.

As explained above, it is possible to adjust the amount value of a drive current by varying the current supply time for the respective excitation phase without any wasting consumption of the source voltage and with low switching noises.

In FIG. 2, the drive timing signal Gt indicates to start the current supply time B from a start point of an excitation phase.

Figure 4:
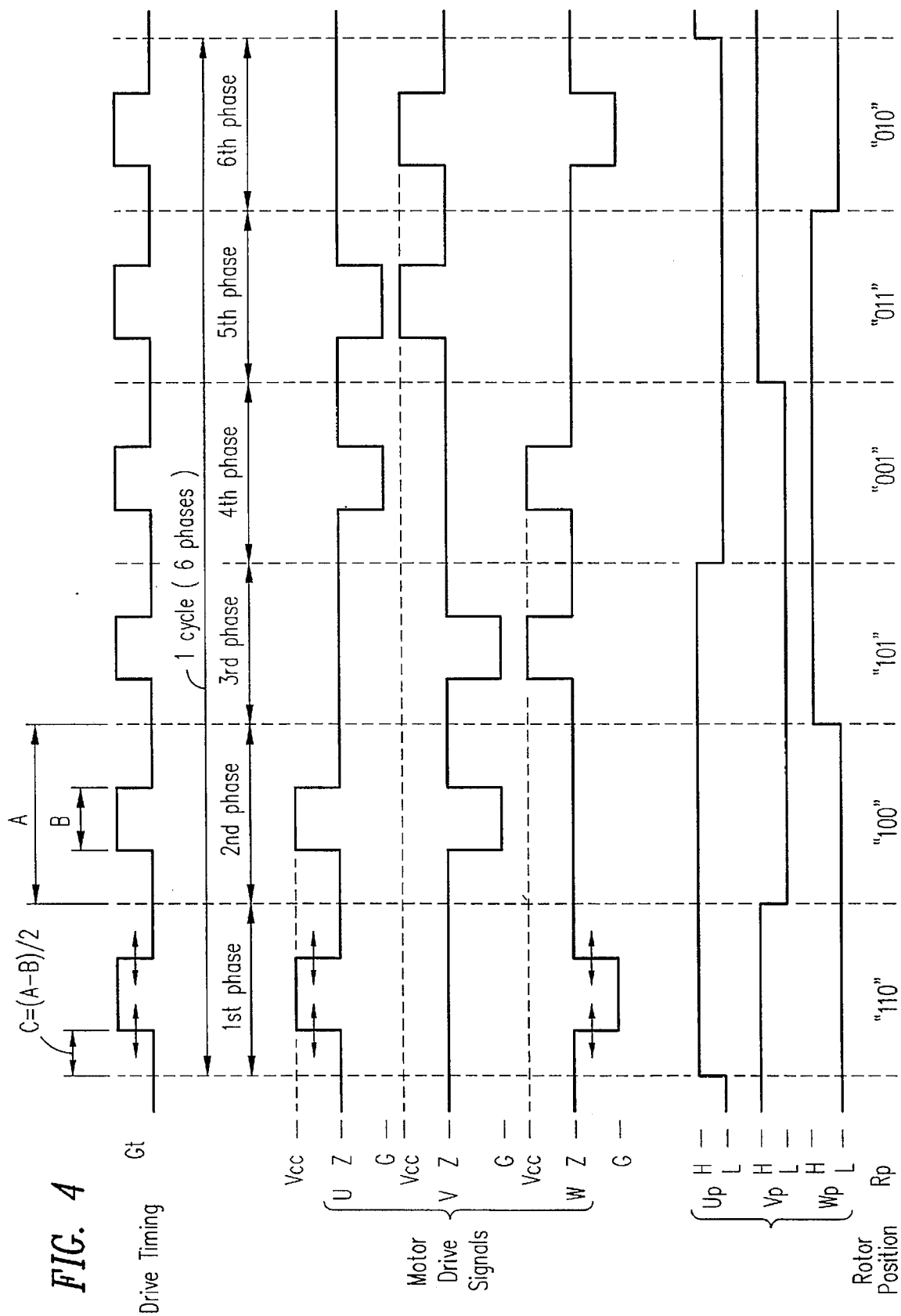
FIG. 4 depicts timing charts for explaining another embodiment of the motor drive apparatus of a high efficiency in which the leading edges of the drive signal current are positioned so as to meet at the peak point of the motor torque ripple.

It is also possible to place the drive timing signal Gt at the center portion of the respective phases as shown in FIG. 4 since the torque ripple of a motor has a peak point at the center of a phase. Namely, the embodiment of FIG. 4 can achieve the most efficient motor drive control by a Small average power consumption.

As shown in FIG. 4, a leading edge of the drive timing pulse Gt is rising up at the distance C from a starting point of the respective phase starting point. The distance C is determined by the calculation of (A-B)/2 so as to meet it's center portion at the peak point of the motor torque ripple.

Consequently, the motor drive signals U,V and W are also shifted so as to synchronize to the drive timing signal as shown in FIG. 4.

In this embodiment of the PW excitation phase synchronous control type spindle motor, it is possible to eliminate a wasting consumption of the power source since the source voltage Vcc is directly supplied to the drive coils by on/off switching operation of the source voltage in accordance with the drive timing signal Gt.

However, it may be happen to produce some noises during the on/off switching operation of the source voltage because its operation is practiced at the state of the maximum current of the source voltage.

In a magnetic disk apparatus, such noises happen to cause a fault during a small signal operation, like a data read/write operation.

In order to prevent from occuring the defect, for a magnetic disk apparatus, it is desirable to practice the motor drive by an electric current control type during the data read/write operation for reducing the noises.

Figure 5:
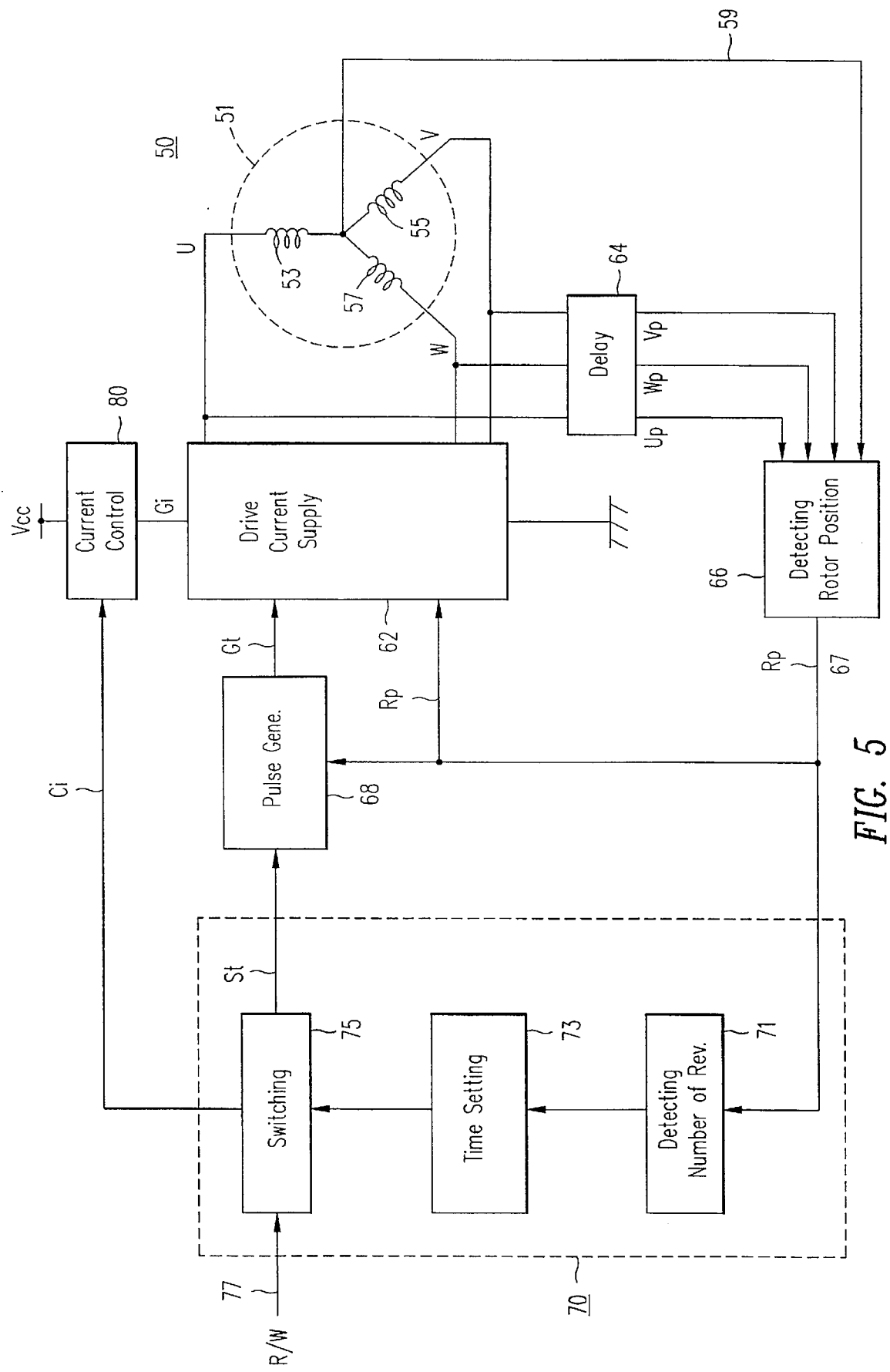
FIG. 5 is a schematic block diagram of the construction of another embodiment of the inventioned apparatus for controlling motor rotation drive of PWM exciting phase synchronous control type.

FIG. 5 shows an another embodiment of the inventioned motor control apparatus which can switch the drive operation mode between the electric current control mode and the PWM excitation phase synchronous control mode.

In FIG. 5, a spindle motor 50 includes a rotor 51 and three drive coils 53, 55 and 57. A drive current supply circuit 62 supplies the three motor drive signals U,V and W to the respective three coils 13, 15 and 17 for providing revolution forces to the rotor 51.

These three motor drive signals U,V and W are also supplied to a delay circuit 64 and the three back electromotive forces Up, Vp and Wp by are produced by superimposition of the motor drive forces U,V and W.

These back electromotive forces Up, Vp and Wp and a motor revolution signal 59 are supplied to the first detecting means 66 for detecting a rotor position by adjusting these signals Up. Vp and Wp with a motor signal of the number of revolution.

The rotor position signal Rp from the first detecting means 66 is commonly supplied a to a drive current supply circuit 62, a pulse forming circuit 68 and a CPU 90.

The drive current supply circuit 62 determines a current direction of excitation during a respective excitating phase for driving a motor revolution.

The pulse forming circuit 68 determines a pulse width of a drive timing signal Gt for the current supply circuit 62.

The CPU 70 determines a current supply time B during one exciting phase in response to a difference between the detected number of motor revolution and a predetermined target number of revolution.

In order to achieve the above-mentioned function, the CPU 70 includes the second detecting means 70 for detecting the number of motor revolution rotation number in response to the rotor position signal Rp from the first detecting means 66, a time setting means 78 for determining a current supply time B by comparing the detected number to the target number of revolution.

Further in this embodiment, a switching means 75 is provided for changing drive signals to the motor drive means 62.

Since read/write signals are easy to receive the influences of switching noises, it is preferable to change a drive mode to the current control type so as to directly supply the source voltage Vcc to the drive current supply 82 through a current control circuit 80 during a read/write operation.

When the read/write operation signal 77 is supplied to the CPU 70, the switching means 75 supplies a current control signal Ci to a current control circuit 80 for selecting the current control type drive mode.

During the other operation than the read/write operation, the current control circuit 80 supplied a maximum current Gi of the source voltage Vcc. The maximum current Gi is controlled on/off action with synchronous to the drive timing signal Gt and successively supplies to the drive coils 53, 55 and 57 as the motor drive signals U, V and W.

Since the drive timing Gt acts on/off switching operation with the current supply time ( B/A ) which is set for one exciting phase from the detected differences of the number of motor revolutions, the revolution control is achieved by the increase/decrease action of the drive current.

Figure 6:
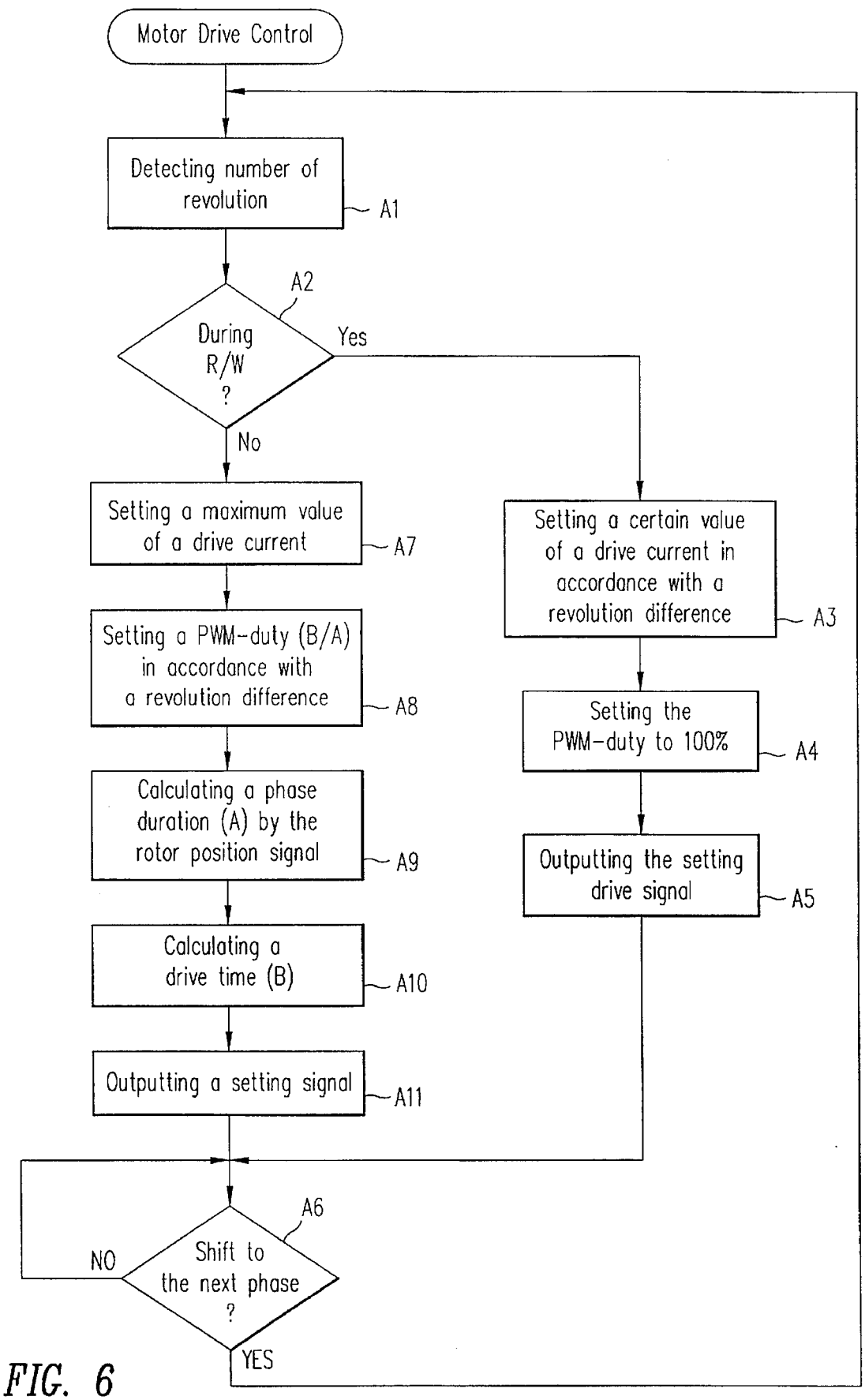
FIG. 6 is a flow chart for explaining the motor drive control operation for the drive apparatus having a mode switching function between the current control type drive mode and the PWM exciting phase synchronous control type drive mode.
Figure 7:
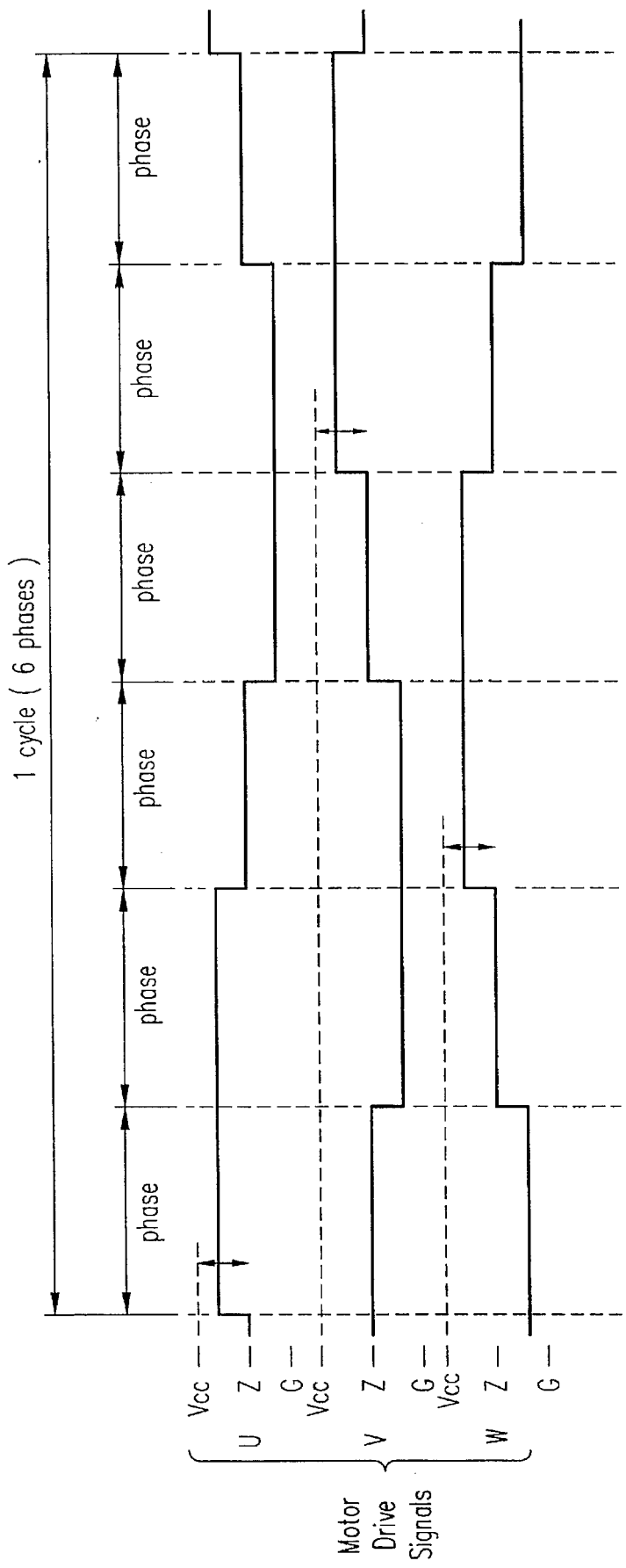
FIG. 7 explains the conventional operation for the current control type three phased spindle motor.
Figure 8:
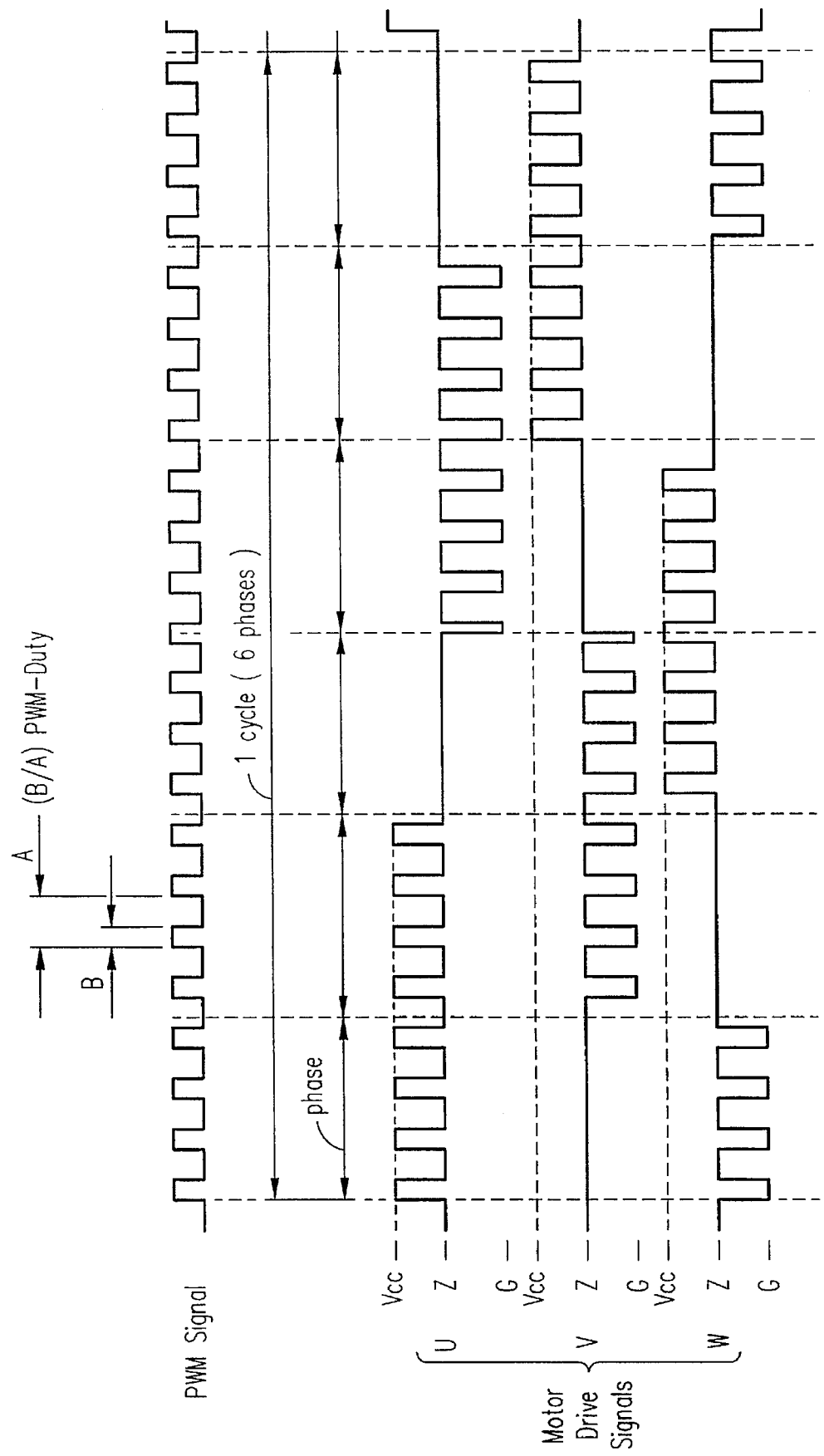
FIG. 8 shows the conventional operation for the chopper control type three phased spindle motor.

FIG. 6 is a flow chart for explaining the motor drive control operation for the drive apparatus having a drive mode switching function between the current control mode and the PWM excitation phase synchronous control mode.

At the first step A1, in the CPU, the number of motor revolution is detected by the rotor position signal Rp from the rotor position detecting circuit.

Then, the operation is judged whether the read/write operation for a magnetic disk or not at the step A2.

If the operation is judged as the read/write operation, i.e., when the judge is [Yes], the CPU sets the current control mode operation.

For setting this mode, a drive current is determined in response to the difference between the detected number of revolution and the target number of revolution at the step A3. At the next step A4, the PWM duty ( B/A ) for one exciting phase is set as 100% and then the time setting signal St of 100% is supplied to the pulse forming circuit.

With detecting a phase shift to the next exciting phase from the rotor position signal Rp at the step A6, the operation goes back to the step A1. And the steps A2 to A6 are repeated until the read/write operation is finished.

According this operation, the apparatus can achieve the motor drive control with the minimized spike noises during the read/write operation.

When the other program operation than the read/write operation is judged at the step A2, i.e., when the judgement is [No], the CPU selects the PWM exciting phase control type drive mode.

For setting this drive mode, at the step A7, the motor drive current is set as a maximum value and the current control signal Ci is supplied to the current control circuit.

Then, at the step A8, a current supply time B/A ( PWM duty ) for one exciting phase is determined in response to the difference between the detected number of the motor revolution at the step A1 and the predetermined target number of the revolution.

At the next step A9, a term A of one phase is determined from the rotor position signal Rp. Then, at the next step A10, an actual drive time B is determined from the one phase term A and the current supply time B/A.

The time setting signal St indicating the actual drive time B is supplied to the pulse forming circuit at the step 11.

When the shifting to the next exciting phase is detected by the rotor position signal Rp, the operation goes back to the step A1. And if the operation is judged as the non-read/write operation, the steps A7 to A 11 are repeated until the finish of the operation.

At the pulse forming circuit, the drive timing signal Gt is produced by using the time setting signal St and the rotor position signal Rp from the rotor position detecting means.

The drive timing signal Gt becomes "ON" state during the actual drive time B in response to the current supply term B/A for one exciting phase with synchronous to the exciting timing.

When the drive timing signal Gt is supplied to the motor drive circuit, the motor drive current Ci at the maximum current value is successively supplied to the respective drive coils by the on/off switching action of the current Ci.

According to the PWM excitation phase control mode, the apparatus achieves the low power consumption control.

As mentioned above, the invention can achieve both of a high efficiency of low power consumption apparatus during a small current operation of read/write and a low spike noise apparatus during the read/write operation.

These embodiments are explained so that the control apparatus uses a sensorless spindle motor. Of course, it is possible to apply the invention to an apparatus using other type motors, like a DC motor or a DC brush-less motor, and so on.

What is claimed is:

1. An apparatus for controlling revolution drive of a motor comprising:

a motor including a rotor and a plurality of drive coils for defining a number of excitation phases for making said rotor complete each one cycle revolution, means for supplying a plurality of drive currents in a successive order to said respective coils from a voltage source directly, means for detecting a rotational position of said rotor in each excitation phase, means for detecting a number of revolution of said rotor by using a position signal from said rotational position detecting means, means for determining a current supply time in each excitation phase by detecting a difference between said detected number of revolution of said rotor and a predetermined target number of revolution of said rotor, and means for generating a drive pulse signal supplied to said supplying means in accordance with a timing signal from said determining means, said drive pulse signal being a single pulse in each of said excitation phases having a duration corresponding to said determined current supply time, whereby said supplying means supplies a maximum value of drive currents synchronized to said excitation phases.

2. An apparatus for controlling revolution drive of a motor of claim 1, wherein:

said means for determining a current supply time includes means for comparing said detected number of revolution of said rotor to a predetermined target number of revolution and means for setting a current supply time in accordance with a detected difference from said means for comparing.

3. An apparatus for controlling revolution drive of a motor of claim 1, wherein:

said means for detecting a rotational position of said rotor supplies said rotor position signal commonly to said means for generating a drive pulse signal and said means for supplying a plurality of drive currents to said plurality of coils.

4. An apparatus for controlling revolution drive of a motor of claim 1, wherein:

said means for supplying a plurality of drive currents to said plurality coils supplies said drive currents so as to meet said current supply time in each of said excitation phases at the maximum point of the efficiency of the excitation.

5. An apparatus for controlling revolution drive of a motor of claims 4, wherein:

said maximum point of the efficiency of the excitation is located at the center portion of said excitation phase.

6. An apparatus for controlling revolution drive of a motor comprising:

a motor including a rotor and a plurality of coils for defining a plurality of excitation phases in accordance with rotational points of said rotor, means for supplying a plurality of drive currents in a successive order to said plurality of coils from a voltage source directly, means for detecting a rotational position of said rotor in each of said plurality of excitation phases, a CPU for detecting a number of revolution of said rotor and for generating a time setting signal for varying a current supply time in accordance with a difference between said number of revolution of said rotor and a predetermined target number of revolution of said rotor, and means for generating drive pulse signals of a determined pulse width in response to said timing signal from said CPU to said means for supplying a plurality of drive currents synchronized to said position signal from said means for detecting a rotor position, said drive pulse signals being a single pulse in each of said excitation phases.

7. An apparatus for controlling revolution drive of a motor of claim 6, wherein:

said means for detecting a position of said rotor supplies a rotor position signal commonly to said CPU, means for supplying a plurality of drive currents and means for generating drive pulse signals supplying a plurality of drive currents, for defining said drive current supply time and an exciting direction of said drive current.

8. An apparatus for controlling revolution drive of a motor of claim 6, wherein:

said means for supplying a plurality of drive currents in a successive order to said plurality of coils supplies said drive currents so as to locate said current supply time in each of said excitation phases at the center portion of said excitation phase.

9. An apparatus for controlling revolution drive of a motor of claim 6, wherein:

said means for generating drive pulse signals includes a counter circuit for varying the pulse width of said drive pulse signals in response to said time setting signal from said CPU.

10. An apparatus for controlling revolution drive of a motor comprising:

a motor including a rotor and a plurality of coils for defining a number of excitation phases for making said rotor complete each one cycle revolution, means for supplying a plurality of drive currents to said plurality of coils in a successive order in said defined number of excitation phases, means for supplying a certain controlled value of constant drive current from a voltage source to said means for supplying a plurality of drive currents, means for detecting a rotational position of said rotor in each of said excitation phases, means for detecting a number of revolution of said rotor by using a rotor position signal from said means for detecting a rotational position of said rotor, means for switching between first and second motor drive control modes by detecting a small signal operation, means for setting a current supply time for an excitation of said coils in each of said excitation phases in accordance with a difference between said detected number of revolution of said rotor and a predetermined target number of revolution of said rotor during said first motor drive control mode during other operations than said small signal operation, and further for setting a current supply time to a full term of each of said excitation phases during said second control mode during said small signal operation, and means for setting a maximum value of said drive current during said first control mode and further for setting a certain value of said drive current in accordance with a detected difference between said detected number of revolution of said rotor and a predetermined target number of revolution of said rotor during said second control mode.

11. An apparatus for controlling revolution drive of a motor of claim 10, wherein:

said means for switching between first and second motor drive control modes switches said mode by detecting a read/write operation.

12. An apparatus for controlling revolution drive of a motor of claims 10 and 11, wherein:

said means for switching between first and second motor drive control modes supplies a current control signal to said means for supplying a certain controlled value of constant drive current in accordance with a detected difference between said detected number of revolution of said rotor and a predetermined target number of revolution of said rotor during a read/write operation.

13. An apparatus for controlling revolution drive of a motor of claims 10 and 11, wherein:

said means for switching between first and second motor drive control modes supplies a time setting signal to a pulse forming circuit so as to set a full time of each of said excitation phases during a read/write operation.

14. A method for controlling rotation drive of a motor including a rotor and a plurality of coils for defining a number of excitation phases, comprising the steps of:

detecting a rotational position of said rotor in each of said excitation phases, detecting a number of revolution of said rotor by using a detected rotor position signal from said step of detecting a rotational position of said rotor, determining a current supply time during each of said excitation phases in accordance with a difference between said detected number of revolution from said step of detecting a number of revolution of said rotor and a predetermined target number of revolution, and supplying a plurality of drive current signals to said plurality of coils in a predetermined successive order synchronized to an excitation timing in response to said detected rotor position, said drive current signals having a single pulse in each of said excitation phases having a duration corresponding to said determined current supply time.

15. A method for controlling rotation drive of a motor according to claim 14, wherein:

said step of determining a current supply time during each of said excitation phases includes the steps of:

setting a PWM duty (B/A) in accordance with a detected difference between said detected member of revolution of said rotor and a predetermined target member of revolution, calculating one phase time (A) from said rotor position signal, and calculating said current supply time (B) from said PWM duty (B/A) and said one phase time (A).

16. A method for controlling rotation drive of a motor including a rotor and a plurality of coils for defining a number of excitation phases, comprising the steps of:

detecting a rotational position of said rotor in each of said excitation phases, detecting a member of revolution of said rotor by using a detected rotor position signal from said step of detecting a rotational position of said rotor, detecting a small signal operation, if said small signal operation is not detected, the method for providing drive currents includes the steps of:

setting a maximum value of drive current, setting a PWM duty (B/A) in accordance with a detected difference between said detected number of revolution of said rotor and a predetermined target number of revolution, calculating one phase time (A) from said rotor position signal, and calculating said current supply time (B) from said PWM duty (B/A) and said one phase time (A), and further if said small signal operation is not detected, the method for providing drive currents includes the steps of:

setting a certain value of drive current in accordance with a detected difference between said detected number of revolution of said rotor and a predetermined target member of revolution of said rotor, setting said PWM-duty to 100%, and setting a drive time to 100% in each excitation phase.

17. A method for controlling rotation drive of a motor including a rotor and a plurality of coils for defining a number of excitation phases, comprising the steps of:

detecting a rotational position of said rotor in each of said excitation phases, detecting a number of revolution of said rotor by using a detected rotor position signal from said step of detecting a rotational position of said rotor, switching first and second motor drive control modes by detecting a small signal operation, setting a current supply time for an excitation of said coils in each of said excitation phases in accordance with a difference between said detected number of revolution of said rotor and a predetermined target number of revolution of said rotor during said first motor drive control mode during other operations than said small signal operation, and further for setting a current supply time to a full term of each of said excitation phases during said second control mode during said small signal operation, and setting a maximum value of said drive current during said first control mode and further setting a certain value of said drive current in accordance with a detected difference between said detected number of revolution of said rotor and a predetermined target number of revolution of said rotor during said second control mode.

* * * * *